United States Patent

[11] 3,626,215

[72] Inventors Eckart Schatter
Munich, Germany;
Hans Ulrich Renk, deceased, late of Munich, Germany; Johanna Elisabeth Renk, nee Johnel, Wurzburg; Sibylle Freia Bergmann, nee Renk, New-Isenberg-Gravenbruch; Ingo Wolfram Renk, heirs, Frankfurt am Main, all of Germany

[21] Appl. No. 66,539
[22] Filed Aug. 24, 1970
[45] Patented Dec. 7, 1971
[73] Assignee Siemens Aktiengesellschaft
Berlin and Munich, Germany
[32] Priority Aug. 28, 1969
[33] Germany
[31] P 19 43 819.8

[54] CIRCUIT ARRANGEMENT FOR AUTOMATIC ELECTRONIC FREQUENCY TRIMMING IN A RECEIVER
4 Claims, 2 Drawing Figs.

[52] U.S. Cl. .......... 307/295, 307/233, 307/262, 307/271, 328/133, 328/140
[51] Int. Cl. .......... H03k 1/16
[50] Field of Search .......... 307/232, 233, 262, 271, 295; 328/133, 138, 140

[56] References Cited

UNITED STATES PATENTS

| | | | |
|---|---|---|---|
| 3,322,973 | 5/1967 | Baldwin | 307/271 |
| 3,330,972 | 7/1967 | Malan | 307/232 |
| 3,386,041 | 5/1968 | Bell | 307/233 |
| 3,387,219 | 6/1968 | Dann | 307/233 |
| 3,434,075 | 3/1969 | Hawkins | 307/233 |
| 3,437,835 | 4/1969 | Mimken et al. | 307/232 |
| 3,479,616 | 11/1969 | Hazzard | 307/262 |
| 3,535,552 | 10/1970 | Warren | 307/262 |
| 3,548,215 | 12/1970 | Hoover | 307/262 |

OTHER REFERENCES

Rasehorn " Neve Schaltungstechnik im Autoempfanger" Funkschau Issue 2 1967 Pages 47- 48 Copy at Lib. of Congress call no. TK7800.F85

Stoner " Semiconductors" CQ Magazine pages 72- 75 April 1960

*Primary Examiner*—Donald D. Forrer
*Assistant Examiner*—R. E. Hart
*Attorneys*—Curt M. Avery, Arthur E. Wilfond, Herbert L. Lerner and Daniel J. Tick

ABSTRACT: Two directional voltages in mutual phase opposition corresponding to the degree and direction of detuning are applied to the base electrodes of corresponding ones of first and second input transistors. Each of the first and second input transistors has a collector electrode connected to a source of supply voltage and an emitter electrode connected to a source of reference voltage via a corresponding one of a pair of ohmic emitter resistors. First and second output transistors are connected in parallel with each other in opposite conductance directions between the emitter electrodes of the input transistors. Each of the first and second output transistors has an emitter electrode directly connected to the emitter electrode of a corresponding one of the input transistors, a collector electrode connected to the emitter electrode of a corresponding one of the input transistors via a corresponding one of one of two pairs of ohmic resistors and a base electrode connected to the emitter electrode of a corresponding one of the input transistors via a corresponding one of the other of the two pairs of ohmic resistors. An output magnitude corresponding to the trimming voltage is derived from the collector electrodes of the output transistors.

CIRCUIT ARRANGEMENT FOR AUTOMATIC ELECTRONIC FREQUENCY TRIMMING IN A RECEIVER

DESCRIPTION OF THE INVENTION

Figure 1:
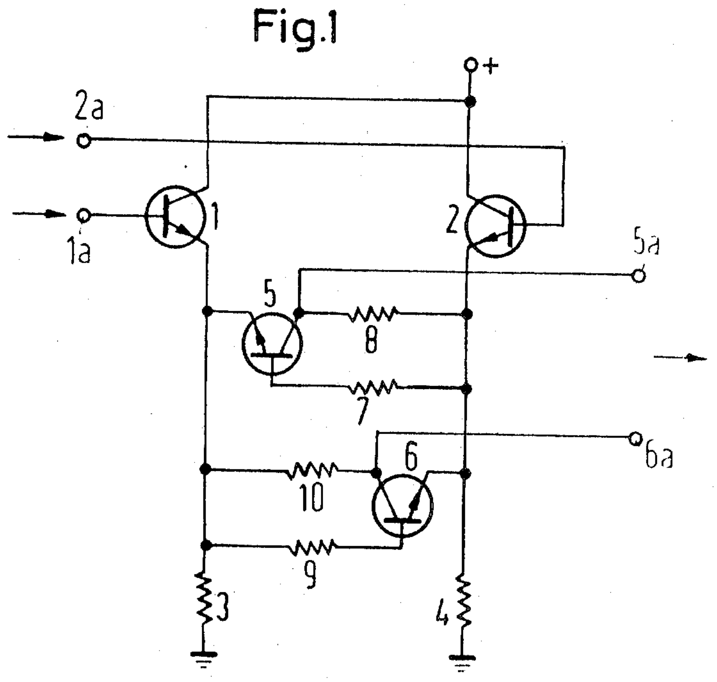

The invention relates to frequency trimming in a receiver. More particularly, the invention relates to a circuit arrangement for automatic electronic frequency trimming in a receiver.

The circuit arrangement of the invention provides automatic electronic frequency trimming in a superimposed receiver having a demodulator which provides two directional voltages in mutual phase opposition corresponding to the degree and direction of detuning.

A circuit arrangement of the aforedescribed type is known, and is discussed, for example, in a periodical entitled "-Funkschau," 1967, Issue 2, page 47. The circuit arrangement provides optimum electronic control of the frequency of oscillation in an automatic receiver. The holding range and the pulling range of the automatic frequency trimming are greatly reduced compared to the usual automatic trimming. Thus, under the difficult conditions present in the automatic receivers of motor vehicles, due particularly to field intensity fluctuations during movement of the vehicle, the circuit arrangement operates satisfactorily and reliably. The circuit arrangement of known type is, however, very expensive and is not readily provided as a monolithic integrated circuit.

The principal object of the invention is to provide a new and improved circuit arrangement for automatic electronic frequency trimming in a receiver.

An object of the invention is to provide a circuit arrangement for automatic electronic frequency trimming in a receiver, which circuit arrangement is integratable.

An object of the invention is to provide a circuit arrangement for automatic electronic frequency trimming in a receiver, which circuit arrangement is not expensive.

An object of the invention is to provide a circuit arrangement for automatic electronic frequency trimming in a receiver, which circuit arrangement functions with efficiency, effectiveness and reliability.

In accordance with the invention, the two directional voltages in mutual phase opposition corresponding to the degree and direction of detuning are applied to the base electrodes of corresponding ones of first and second input transistors. The collector electrodes of the input transistors are at supply potential and the emitter electrodes of the input transistors are at reference potential via corresponding ohmic emitter resistors. First and second output transistors are connected in parallel with each other in opposite conductance directions between the emitter electrodes of the input transistors. The emitter electrode of each of the output transistors is directly connected to the emitter electrode of a corresponding one of the input transistors. The base electrode of each of the output transistors is connected to the emitter electrode of a corresponding one of the input transistors via a corresponding ohmic resistor. The trimming voltage is derived from the collector electrodes of the output transistors as an output magnitude of the circuit arrangement.

In accordance with the invention, a circuit arrangement for automatic electronic frequency trimming in a superimposed receiver having a demodulator which provides two directional voltages corresponding in mutual phase opposition to the degree and direction of detuning, comprises a source of supply voltage, a source of reference voltage and a pair of ohmic emitter resistors. Each of first and second input transistors has a base electrode, a collector electrode connected to the source of supply voltage and an emitter electrode connected to the source of reference voltage via a corresponding one of the emitter resistors. Input means applies each of the directional voltages to the base electrode of a corresponding one of the first and second input transistors. Two pairs of ohmic resistors are provided. First and second output transistors are connected in parallel with each other in opposite conductance directions between the emitter electrodes of the input transistors, each of the first and second output transistors has an emitter electrode directly connected to the emitter electrode of a corresponding one of the input transistors, a collector electrode connected to the emitter electrode of a corresponding one of the input transistors via a corresponding one of one of the two pairs of ohmic resistors and a base electrode connected to the emitter electrode of the corresponding one of the input transistors via a corresponding one of the other of the two pairs of ohmic resistors. Output means is connected to the collector electrodes of the output transistors for deriving an output magnitude corresponding to the trimming voltage.

A first additional ohmic resistor is in series circuit arrangement with a first group of three diodes between the first input transistor and the corresponding one of the pair of emitter resistors. A second additional ohmic resistor is in series circuit arrangement with a second group of three diodes between the second input transistor and the corresponding one of the pair of emitter resistors.

The first additional ohmic resistor is connected between the emitter electrode of the first input transistor and the emitter electrode of the first output transistor. Two diodes of the first group of diodes are connected in series between the emitter electrode of the first output transistor and the collector electrode of the second output transistor via the corresponding one of the one of the two pairs of ohmic resistors. The third diode of the first group of diodes is connected between the collector electrode of the second output transistor via the corresponding one of the one of the two pairs of ohmic resistors and the base electrode of the second output transistor via the corresponding one of the other of the two pairs of ohmic resistors.

The second additional ohmic resistor is connected between the emitter electrode of the second input transistor and the collector electrode of the first output transistor via the corresponding one of the one of the two pairs of ohmic resistors. A first diode of the second group of diodes is connected between the collector electrode of the first output transistor via the corresponding one of the one of the two pairs of ohmic resistors and the base electrode of the first output transistor via the corresponding one of the other of the two pairs of ohmic resistors. A second diode of the second group of diodes is connected between the base electrode of the first output transistor via the corresponding one of the other of the two pairs of ohmic resistors and the emitter electrode of the second output transistor. The third diode of the second group of diodes is connected between the emitter electrode of the second output transistor and the corresponding one of the emitter resistors.

In comparison with the known circuit arrangement, the circuit arrangement of the invention utilizes a very small number of components and is easy to integrate, since no capacitors are utilized.

Figure 2:
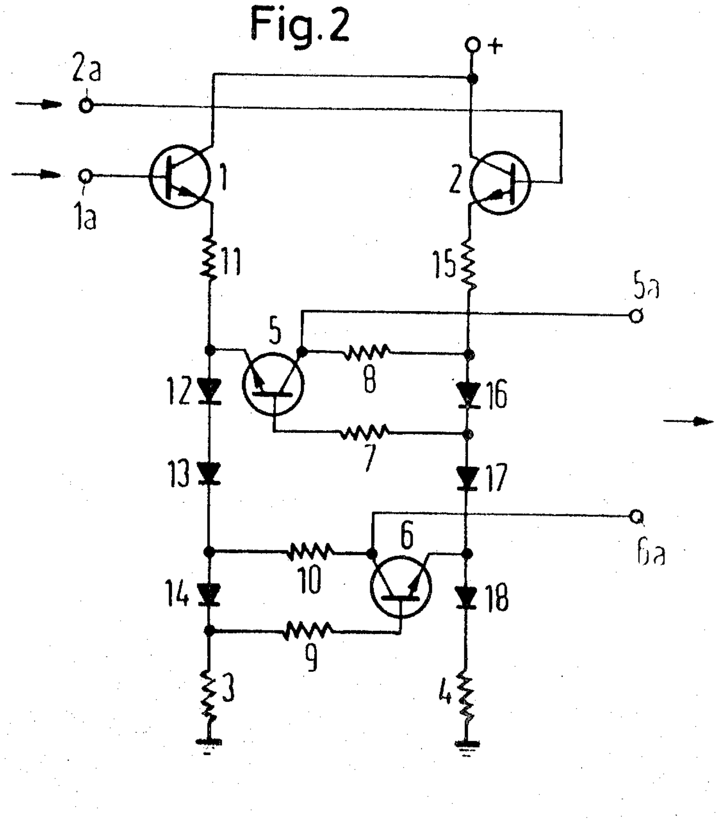

In order that the invention may be readily carried into effect, it will now be described with reference to the accompanying drawing, wherein:

FIG. 1 is a circuit diagram of an embodiment of the circuit arrangement of the invention for automatic electronic frequency trimming; and FIG. 2 is a circuit diagram of another embodiment of the circuit arrangement of the invention for automatic electronic frequency trimming.

In FIG. 1, an input terminal 1*a* is connected directly to the base electrode of a first input transistor 1 and an input terminal 2*a* is directly connected to the base electrode of a second input transistor 2. The input terminals 1*a* and 2*a* are indicated by arrows. The collector electrode of each of the first and second input transistors 1 and 2 is directly connected to a source of supply potential, indicated by a positive polarity symbol. The emitter electrode of the first input transistor 1 is connected to a source of reference potential such as, for example, ground, via a first ohmic emitter resistor 3. The emitter electrode of the second input transistor 2 is connected to a source of reference potential such as, for example, ground, via a second ohmic emitter resistor 4.

First and second output transistor 5 and 6, respectively, are connected in parallel with each other in opposite conductance directions between the emitter electrodes of the first and second input transistors 1 and 2. The emitter electrode of the first output transistor 5 is directly connected to the emitter electrode of the first input transistor 1. The emitter electrode of the second output transistor 6 is directly connected to the emitter electrode of the second input transistor 2. The base electrode of the first output transistor 5 is connected to the emitter electrode of the second input transistor 2 via an ohmic resistor 7. The base electrode of the second output transistor 6 is connected to the emitter electrode of the first input transistor 1 via an ohmic resistor 9.

The collector electrode of the first output transistor 5 is connected to the emitter electrode of the second input transistor 2 via an ohmic resistor 8. The collector electrode of the second output transistor 6 is connected to the emitter electrode of the first input transistor 1 via an ohmic resistor 10. An output for deriving an output magnitude corresponding to the trimming voltage is connected to the collector electrodes of the first and second output transistors 5 and 6. The output, indicated by the single arrow, comprises a pair of output terminals 5*a* and 6*a*.

When the intermediate frequency of the receiver corresponds to the median frequency of the demodulator, the two directional voltages derived from the demodulator, and applied to the input terminals 1*a* and 2*a* of the circuit arrangement, are of the same magnitude. The base electrodes of the two input transistors 1 and 2, and thus their emitter electrodes, have the same potential. Consequently, the collector electrodes of the two output transistors 5 and 6 also have the same potential, via the resistors 8 and 10. The directional voltage derived at the output terminals 5*a* and 6*a* of the circuit arrangement is zero.

When the intermediate frequency deviates from the median frequency, the potentials undergo a mutual shifting at the base electrodes of the input transistors 1 and 2. One or the other of the input transistors 1 and 2 becomes more conductive in accordance with the shifting direction of the potentials. If, for example, the directional voltage applied to the base electrode of the second input transistor 2 is more positive than the directional voltage applied to the base electrode of the first input transistor 1, the input transistor 2 will be at a further advanced control than will the first input transistor 1. As a result, the emitter potential of the second input transistor 2 shifts in a positive direction, and the potential at the collector electrode of the first output transistor 5 also shifts in a positive direction, via the resistor 8. The directional voltage derived at the output thus has a magnitude which corresponds to the degree of shifting and a polarity which corresponds to the direction of shifting. The output transistors 5 and 6 still do not conduct a current.

When the shifting, and thus the potential difference, of the emitter electrodes of both input transistors 1 and 2 exceeds a specific magnitude, however, one of the two output transistors 5 and 6 becomes conductive when it exceeds its threshold voltage, in accordance with the polarity of the potential difference, and permits the directional voltage to break up increasingly, as the detuning increases. The directional voltage breaks up increasingly, until it reaches a substantially zero magnitude, except for the magnitude of the residual voltage of the conductive output transistor.

In the embodiment of FIG. 2, the degree of shifting, where the directional voltage is to drop off again, as well as a bias voltage stabilized against the energizing voltage fluctuations, may be exactly adjusted with a median frequency in the output terminals 5*a* and 6*a*. In the embodiment of FIG. 2, a plurality of components are connected in the emitter leads of the first and second input transistors 1 and 2.

An ohmic resistor 11 is connected in series with a first group of three diodes 12, 13 and 14 between the emitter electrode of the first input transistor 1 and the emitter resistor 3. An ohmic resistor 15 is connected in series with a second group of three diodes 16, 17 and 18 between the emitter electrode of the second input transistor 2 and the emitter resistor 4.

The emitter electrode of the first output transistor 5 is connected to a common point in the connection between the ohmic resistor 11 and a first diode 12 of the first group of diodes. The collector electrode of the first output transistor 5 is connected to a common point in the connection between the ohmic resistor 15 and a first diode 16 of the second group of diodes, via the resistor 8. The base electrode of the first output transistor 5 is connected to a common point in the connection between the diodes 16 and 17 of the second group of diodes, via the resistor 7.

The emitter electrode of the second output transistor 6 is directly connected to a common point in the connection between the diodes 17 and 18 of the second group of diodes. The collector electrode of the second output transistor 6 is connected to a common point between the diodes 13 and 14 of the first group of diodes, via the resistor 10. The base electrode of the second output transistor 6 is connected to a common point between the third diode 14 of the first group of diodes and the emitter resistor 3, via the ohmic resistor 9.

The input transistors 1 and 2 are of the same type and characteristics, the resistors 11 and 15 are of the same type and resistance values, the diodes 12 and 16 are of the same type and characteristics, the diodes 13 and 17 are of the same type and characteristics, the diodes 14 and 18 are of the same type and characteristics and the emitter resistors 3 and 4 are of the same type and resistance values. A voltage is therefore provided at the output terminals which corresponds to the forward voltages of the diodes 12 and 13, if the base electrode of the first input transistor 1 has the same biasing voltage as the base electrode of the second input transistor 2.

If the emitter potential of the first input transistor 1 becomes more positive than the emitter potential of the second input transistor 2, at various directional voltages, the trimming voltage derived from the collector electrodes of the output transistors 5 and 6 follows such emitter potentials in accordance with the voltage dividing ratio of the resistors 11 and 3, and 15 and 4, respectively.

The collector electrode of the first output transistor 5 is more positive than the collector electrode of the second output transistor 6. When there is further potential shifting, the emitter-base threshold voltage of the second output transistor 6 and the forward voltage of the diode 14 are overcome and said output transistor becomes conductive. This short-circuits the trimming voltage and decreases the trimming voltage during further potential shifting, down to the value of the forward voltages of the diodes 16 and 17 and the residual voltage of the output transistor 6.

The transistors of the embodiments of FIGS. 1 and 2 are illustrated as being of NPN type. This type of transistor was selected in accordance with a preferred integration. It is understood, of course, that PNP transistors may be utilized with the appropriate circuit changes.

While the invention has been described by means of specific examples and in specific embodiments, we do not wish to be limited thereto, for obvious modifications will occur to those skilled in the art without departing from the spirit and scope of the invention.

We claim:

1. A circuit arrangement for automatic electronic frequency trimming in a superimposed receiver having a demodulator which provides two directional voltages in mutual phase opposition corresponding to the degree and direction of detuning, said circuit arrangement comprising a source of supply voltage;

a source of reference voltage;

a pair of ohmic emitter resistors;

first and second input transistors each having a base electrode, a collector electrode connected to said source of supply voltage and an emitter electrode connected to said source of reference voltage via a corresponding one of said emitter resistors;

input means for applying each of said directional voltages to the base electrode of a corresponding one of said first and second input transistors;

two pairs of ohmic resistors;

first and second output transistors connected in parallel with each other in opposite conductance directions between the emitter electrodes of said input transistors, each of said first and second output transistors having an emitter electrode directly connected to the emitter electrode of a corresponding one of said input transistors, a collector electrode connected to the emitter electrode of a corresponding one of said input transistors via a corresponding one of one of the two pairs of ohmic resistors and a base electrode connected to the emitter electrode of the corresponding one of said input transistors via a corresponding one of the other of the two pairs of ohmic resistors; and output means connected to the collector electrodes of said output transistors for deriving an output magnitude corresponding to the trimming voltage.

2. A circuit arrangement as claimed in claim 1, further comprising a first additional ohmic resistor in series circuit arrangement with a first group of three diodes between said first input transistor and the corresponding one of said pair of emitter resistors and a second additional ohmic resistor in series circuit arrangement with a second group of three diodes between said second input transistor and the corresponding one of said pair of emitter resistors.

3. A circuit arrangement as claimed in claim 2, wherein the first additional ohmic resistor is connected between the emitter electrode of said first input transistor and the emitter electrode of said first output transistor, two diodes of said first group of diodes are connected in series between the emitter electrode of said first output transistor and the collector electrode of said second output transistor via the corresponding one of the one of the two pairs of ohmic resistors, and the third diode of said first group of diodes is connected between the collector electrode of said second output transistor via the corresponding one of the one of the two pairs of ohmic resistors and the base electrode of said second output transistor via the corresponding one of the other of the two pairs of ohmic resistors.

4. A circuit arrangement as claimed in claim 3, wherein the second additional ohmic resistor is connected between the emitter electrode of said second input transistor and the collector electrode of said first output transistor via the corresponding one of the one of the two pairs of ohmic resistors, a first diode of said second group of diodes is connected between the collector electrode of said first output transistor via the corresponding one of the one of the two pairs of ohmic resistors and the base electrode of said first output transistor via the corresponding one of the other of the two pairs of ohmic resistors, a second diode of said second group of diodes is connected between the base electrode of said first output transistor via the corresponding one of the other of the two pairs of ohmic resistors and the emitter electrode of said second output transistor, and the third diode of said second group of diodes is connected between the emitter electrode of said second output transistor and the corresponding one of said emitter resistors.

* * * * *